US 6,604,387 B2

(12) United States Patent
Digonnet et al.

(10) Patent No.: US 6,604,387 B2
(45) Date of Patent: *Aug. 12, 2003

(54) METHOD OF INDUCING MAXIMUM NON-LINEARITIES INTO SILICA FOR PHASE MODULATORS & SWITCHES

(75) Inventors: Michel Digonnet, Palo Alto, CA (US); Alice Liu, Palo Alto, CA (US); Gordon Kino, Stanford, CA (US)

(73) Assignee: The Board of Trustees of the Leland Stanford Junior University, Stanford, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,353

(22) Filed: Aug. 7, 1997

(65) Prior Publication Data

US 2001/0047669 A1 Dec. 6, 2001

Related U.S. Application Data

(63) Continuation-in-part of application No. 08/658,068, filed on Jun. 4, 1996, now abandoned.

(51) Int. Cl.[7] .............................................. C03B 37/10
(52) U.S. Cl. .............................. 65/385; 65/111; 65/425
(58) Field of Search ............................ 65/425, 385, 111

(56) References Cited

U.S. PATENT DOCUMENTS

| 2,897,126 A | 7/1959 | George |
| 3,681,041 A | 8/1972 | D'Huart ........................ 65/30 |
| 3,850,603 A | * 11/1974 | Drake |
| 3,880,630 A | 4/1975 | Izawa ............................. 65/30 |
| 4,557,742 A | 12/1985 | Thigpen .......................... 65/2 |
| 5,127,928 A | 7/1992 | Farries et al. .................... 65/2 |
| 5,237,576 A | * 8/1993 | DiGiovanni |
| 5,401,003 A | * 3/1995 | Aizatulov |
| 5,436,758 A | 7/1995 | Agostinelli et al. ......... 359/332 |
| 5,617,499 A | 4/1997 | Brueck et al. .............. 385/122 |
| 5,676,587 A | * 10/1997 | Landers |
| 5,777,432 A | * 7/1998 | Xie |
| 5,907,652 A | * 5/1999 | DiGiovanni |
| 6,001,470 A | * 12/1999 | Niwa |

FOREIGN PATENT DOCUMENTS

| WO | WO 90/08970 | 1/1990 |
| WO | WO 95/29425 | 4/1995 |

OTHER PUBLICATIONS

M.C. Farries and A.J. Rogers, Temperature Dependence of the Kerr Effect in Silica Optical Fibre, *Electronics Letters*, vol. 19, No. 21, 13th Oct. 1983, pp. 890–891.

U. Österburg and W. Margulis, Dye laser pumpled by Nd: YAG laser pulses frequencey doubled in a glass optical fiber, *Optics Letters*, vol. 11, No. 8, Aug. 1986, pp. 516–518.

D.M. Krol and J.R. Simpson, Photoinduced second–harmonic generation in rare–earth–doped aluminosilicate optical fibers, *Optics Letters*, vol. 16, No. 21, Nov. 1, 1991, pp. 1650–1652.

R.A. Myers, N. Mukherjee, and S.R.J. Brueck, Large second–order nonlinearity in poled fused silica, *Optics Letters*, vol. 16, No. 22, Nov. 15, 1991, pp. 1732–1734.

(List continued on next page.)

Primary Examiner—John Hoffmann
(74) Attorney, Agent, or Firm—Knobbe, Martens, Olson & Bear, LLP

(57) ABSTRACT

A process of poling a silica material such as an optical fiber whereby electro-optic non-linearities are induced so that the material can function as a phase modulator and switch in optical communications applications. The poling is effected at an elevated temperature on the order of 450° C. or higher, using an electric field on the order of 800 V/$\mu$m or higher for a period of time in the range of one minute to several tens of minutes.

15 Claims, 1 Drawing Sheet

High Field & High Temperature Poling Apparatus

OTHER PUBLICATIONS

J.F. Valley, J.W. Wu, S. Ermer, M.Stiller, E.S. Binkley, J.T. Kenney, G.F. Lipscomb, and R. Lytel, *Thermoplasticity and parallel–plate poling of electro–optic polyimide host thin films, Applied Physics Letters*, vol. 60, No. 2, Jan. 13, 1992, pp, 160–162.

T. Fujiwara, D. Wong, Y. Zhao, S. Fleming, S. Poole, and M. Sceats, Electro–OpticEffect Induced by UV–Excited Poling in a Silica Fibre, *19$^{th}$ Australian Conference on Optical Fiber Technology*, Postdeadline Paper PDP–3 (1994).

U. Österburg and W. Margulis, Dye laser pumped by Nd:YAG laser pulses frequency doubled in a glass optical fiber, *Optics Letters*, vol. 11, No. 8, Aug. 1986, pp. 516–518.

Richard A. Myers and S.R.J. Brueck, *Stable Second–Order Nonlinearity in $SiO_2$–Based Waveguides on Si Using Temperature/Electric Field Poling, Doped fiber devices and systems, SPIE 2289*, San Diego, Jul. 1994, pp. 1–3.

P.G. Kazansky and P. St.J. Russell, *Thermally poled glass: frozen–in electric field or oriented dipoles?, Optical Communication*, vol. 110, Sep. 1, 1994, pp. 611–614.

X.–C. Long, R.A. Myers, and S.R.J. Brueck, *Measurement of linear electro–optic effect in temperature/electric–electric field poled optical fibres, Electronics Letters*, vol. 30, No. 25, 8$^{th}$ Dec. 1994, pp. 2162–2163.

L.E. Myers, R.C. Eckardt, M.M. Fejer, R.L. Beyer, W.R. Bosenbert, and J.W. Pierce, *Quasi–phase–matched optical parametric oscillators in bulk periodically poled $LiNbO_3$, Journal of the Optical Society of America B.(Optical Physics)*, vol. 12, No. 11, Nov. 1995, pp. 2102–2116.

P.G. Kazansky, A.R. Smith, L. Dong, P. St.J. Russell, *Second harmonic generation in silica fibers poled via internal electrodes, Conference on Lasers and Electro–Optics 1996 (CLEO'96)*, Paper CWK2 (Jun. 1996).

\* cited by examiner

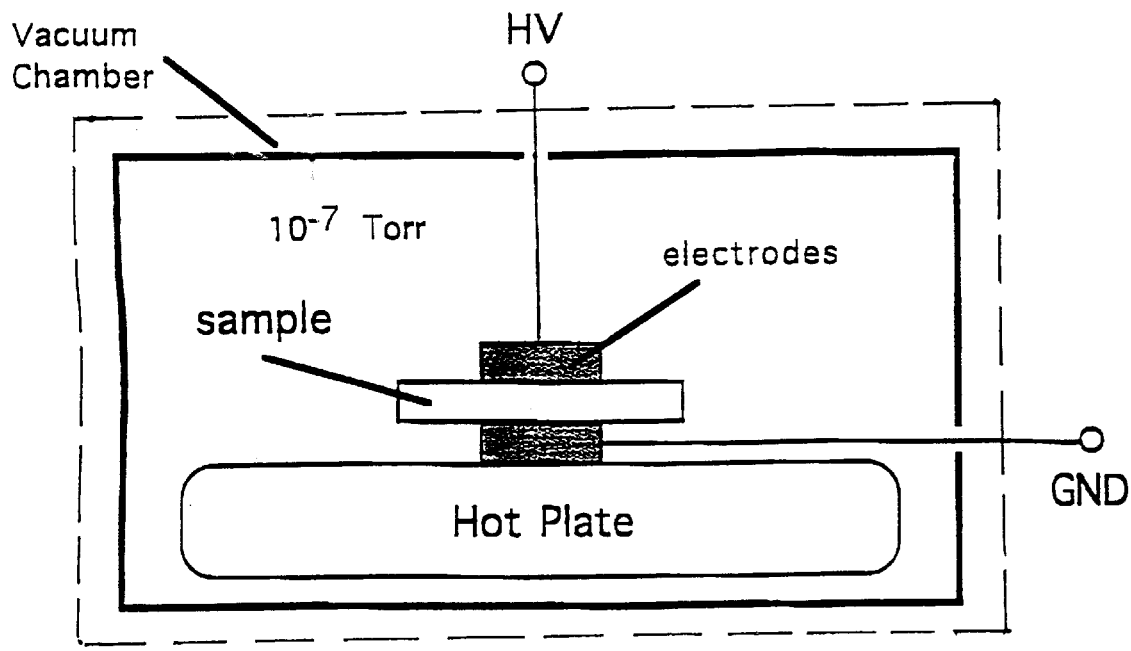
Fig. 1 High Field & High Temperature Poling Apparatus
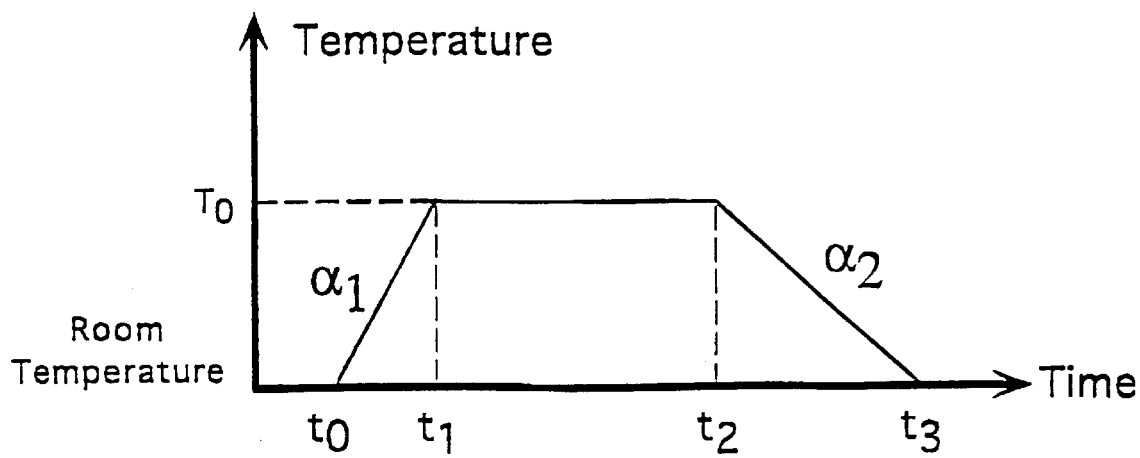
Fig. 2 Poling Temperature Cycle

METHOD OF INDUCING MAXIMUM NON-LINEARITIES INTO SILICA FOR PHASE MODULATORS & SWITCHES

This patent application is a Continuation in Part of U.S. patent application Ser. No. 08/658,068, filed Jun. 4, 1996.

BACKGROUND OF THE INVENTION

This invention relates generally to optical communication, and more particularly the invention relates to a method of treating silica optical fibers and other silica based material using heat and a poling electric field to induce optical non-linearities therein as necessary for optical modulation and switching.

Phase modulators and switches operating in the gigahertz to multigigahertz range are key devices needed for optical communication systems, local area networks, and fiber sensors, in particular in the fiber gyroscope. To date, low voltage phase modulation and switching at reasonably high frequency (>1 MHz) is not available in all-fiber component, of any form. It is typically provided by a $LiNbO_3$ integrated optic (IO) channel waveguide device, which relies on the electro-optic properties of $LiNbO_3$ to modulate the phase of the optical signal via an externally applied electric field. These IO devices, however, introduce a relatively high coupling loss, at least 1 dB, when inserted in an optical fiber circuit. The process of physically coupling the IO device to the fiber, called pigtailing, is also costly and difficult. Replacing these IO channel waveguide modulators by an all-fiber modulator would eliminate the high cost and technical difficulties by providing a device which can be directly spliced to the circuit fiber. Splicing would also eliminate altogether mechanical instabilities and undesirable reflection losses which typically occur at a fiber/IO interface.

In the communication area, the loss constraints are even greater. A large portion of the fiber-optical market is projected to be multi-user systems involving hundreds of serial switches, with exceedingly low overall loss, typically under 0.1 dB. Such a stringent requirement again essentially rules out IO components. These considerations practically dictate that these devices must be made in a glass-based fiber. Many other applications will also benefit from the low transmission loss of fiber-based devices in the far IR and UV, and other electro-optic devices, electro-optic fiber modulators and switches can thus be used over a broad range of wavelengths and powers.

SUMMARY OF THE INVENTION

An object of this invention is a new process which will induce a large electro-optic coefficient in glass-based materials, including, but not limited to, standard optical fibers and IO waveguides made in fused silica, and thus make it possible to fabricate low-voltage electro-optic phase and amplitude modulators and switches in a single-mode fiber. Like their IO counterpart, these devices will be driven directly by a low voltage, low current electrical signal.

Briefly, a silica optical fiber or other glass based material is placed in an oven within an enclosure which is preferably a vacuum chamber. Temperature in the oven is ramped from room temperature to a maximum value $T_1$, which is on the order of 450° C. or higher. The temperature is ramped at a rate which will not physically damage the glass material. An electric field is applied to the silica material either during the temperature ramping or after the maximum temperature is reached. The field should be as high as possible, on the order of 800 V/$\mu$m or higher, and/or the voltage should be as high as possible (10 kV or higher), without exceeding the dielectric breakdown of the material. The temperature and electric field are maintained for a period of time (poling time) which is in the range of seconds to several tens of minutes. The temperature is then ramped down at a rate slow enough to allow the material to be in constant poling equilibrium. The voltage is switched off when the temperature of the sample has dropped to a low enough value, ideally room temperature (typically 20° C.) although higher temperatures (such as 50° C.) may be also suitable.

The invention including processing alternatives will be more readily apparent from the following description and appended claims when taken with the drawings.

BRIEF DESCRIPTION OF THE DRAWINGS

FIG. 1 illustrates apparatus for use in carrying out the invention.

FIG. 2 is a time and temperature plot illustrating a poling temperature cycle of the invention.

DETAILED DESCRIPTION OF THE PREFERRED EMBODIMENT

Standard single-mode fibers are made of amorphous silica, which does not normally exhibit a second-order nonlinearity, in particular the electro-optic effect. The process we are proposing to use to induce a second-order nonlinearity in a fiber is poling, following an approach pioneered by S. Brueck and co-workers at the University of New Mexico a few years ago. See R. A. Myers, N. Mukherjee, and S. R. J. Brueck, "Large Second-Order Nonlinearity in Poled fused Silica," Opt. Lett. Vol. 16, 1732 (1991). Poling involves elevating the temperature of the glass sample to around 280° C. and applying a high voltage across it for a few minutes (see Myers et al). This simple process has been used to induce an electro-optic (nonlinear) coefficient r of the order of 0.4 pm/V in a silica substrate X.-C. Long, R. A. Myers, and S. R. J. Brueck, "Measurement of linear electrooptic effect in temperature/electric-field poled optical fibres," Electronic Letters vol. 30, pp. 2162–2163, 1994. This value is two to three orders of magnitude stronger than had ever been induced before, by a different process (photo-induced nonlinearity), in similar fibers. See U. Osterburg and W. Margulis, "Dye Laser Pumped by Nd:YAG Laser Pulses Frequency Doubled in a Glass Optical Fiber," Opt. Lett. Vol. 11, 516 (1986) and D. M. Krol and J. R. Simpson, "Photoinduced Second-Harmonic Generation in Rare-Earth-Doped Aluminosilicate Optical Fibers," Opt. Lett. Vol. 16, No. 21, 1650–1652, November 1991. We, and several others, have since applied this poling process to successfully demonstrate electro-optic phase modulators and second harmonic generation in a variety of glass-based materials, including a silica channel waveguide. See A. C. Liu, M. J. F. Digonnet, and G. S. Kino, "Electro-Optic Phase Modulation in a Silica Channel Waveguide," Opt. Lett. Vol. 19, No. 7, 466–468 (April 1994). The electro-optic coefficient inferred from these measurements is typically of the same order as reported by Brueck et al. However, because the nonlinear region created by the poling process defined above extends across only a portion of the waveguide core, and because its nonlinearity is still too weak, the observed phase modulation was relatively low, about 35 mrd. For comparison, to make a useful phase modulator or a switch, one requires a phase modulation of $\pi$. A year and a half ago, research on the same effect at the Optical Fiber Technology center (OFTC) in Australia led to the demonstration of an electro-optic coefficient r of 5.8 pm/V. See T. Fujiwara, D. Wong, Y. Zhao, S. Fleming, S. Poole, and M. Sceats, "Electro-optic effect induced by UV-excited poling in a silica fibre," 19th Australian Conf. on Opt. Fibre Techno., Postdeadline Paper PDP-3, 1994. To do so, they poled a fiber at room temperature under UV exposure and a much stronger electric field (~80 V/$\mu$m) than used before. Recently, the University of Southampton reported a new result in a fiber from which an electro-optic coefficient of r of 1.3 pm/V can be inferred. See P. G. Kazansky, A. R. Smith, L. Dong, P. St. J. Russell, "Second harmonic generation in silica fibers poled via internal electrodes," Conf. on Lasers and Electro-optics 1996, Paper CWK2, June 1996.

For calibration purposes, the electro-optic coefficient r of $LiNbO_3$ used in standard commercial IO modulators is ~31 pm/V. With this value, in a 2.5-cm long $LiNbO_3$ waveguide, a phase modulation of $\pi$ at a signal wavelength of 1.55 $\mu$m requires ~10 volts of electrical signal. The response time of the electro-optic effect is extremely short, probably in the 10 fs range. Thus the response of the modulator is imposed by the electrical circuit, and will be in the nanosecond to picosecond range, depending on the circuit design. Such high modulation frequencies are possible because the applied voltage, again typically 10 volts, is low enough. An important consideration is that the dielectric constant of silica is about ½₀ that of $LiNbO_3$. Consequently, an electro-optic silica fiber device can be 20 times longer than an $LiNbO_3$ device and still have the same capacity and thus frequency responses. Consequently, even a comparatively long devices (tens of cm) will respond in the GHz range. Conversely, if we compare the requirements of a $LiNbO_3$ modulator to that of a poled silica modulator with a smaller nonlinearity, the latter will require a longer device but the same modulation voltage, and it will exhibit the same response time. In other words, for a silica device we can tolerate a somewhat smaller nonlinearity, i.e. of the order of a few pm/V, to produce a practical high-speed device.

Although the above results are encouraging, the field suffers from several problems. First, the value of 5.8 pm/V reported by OFTC has been in question ever since its publication. Several research groups have attempted to reproduce it, including ourselves and the original researchers, without success. Second, the value of 0.4 pm/V, which several groups have reproduced, again including ourselves, occurs typically over a spatial region of only a few microns below the poling anode. The nonlinear region is thus physically too small and not quite strong enough for practical devices. Third, the physical process that leads to the formation of a nonlinear region is still poorly understood, and until recently there were serious doubts among workers in the field that a value as high as 5.8 pm/V could be explained physically.

We have carried out experiments and theoretical investigations which suggest a possible mechanism for this non-linearity. So far, the tentative explanation has been what is called rectification of the $\chi^{(3)}$ of silica. Silica exhibits a third-order nonlinearity, known as the Kerr effect. According to the rectification model, during poling space charges (electrons) are displaced a short distance within the material, and trapped a little further than their original location, for example at defect sites. These charges, combined with the positively charged hole they left behind, create an internal electric field $E_{DC}$. When this poled material is used as a modulator, a modulating electric field $E(\omega)$ at frequency $\omega$ is applied across it, and the optical signal to be modulated is launched into the material. The three fields ($E_{DC}$, $E(\omega)$, and the optical signal) are then mixed by the third-order non-linearity to produce an optical signal modulated at frequency $\omega$. It is said that the DC field has rectified the third-order nonlinearity. The device acts like an electro-optic modulator, with an equivalent r which can be shown to be $r=1.36\chi^{(3)}E_{DC}$.

This last equation can be used to estimate the maximum possible r one can achieve with this process. In practice, it is difficult to estimate the electric field $E_{DC}$ induced by the poling process. However, we can put an upper bound on its possible range of values, since this field cannot exceed the dielectric breakdown field of silica. The breakdown field of silica is not well known, and it depends on several parameters, including glass composition, impurity levels, and mechanical properties, but the highest cited value, measured in a fiber, is about 800 V/$\mu$m. The $\chi^{(3)}$ which is proper to use in the above equation is the $\chi^{(3)}$ for DC electric field. Although the value for this parameter in silica has never been measured, a lower bound value can be inferred from measurements of the difference between two elements of the tensor $\chi^{(3)}$ (see for example M. C. Farries and A. J. Rogers, "Temperature dependence of the Kerr effect in a silica optical fibre," Electronic Letters vol. 19, pp. 890–891, 1983). From this reference, it can be inferred that $\chi^{(3)}>1.6 \cdot 10^{-22}$ m$^2$/V. Based on the equation cited at the end of the previous paragraph, $r=1.36\chi^{(3)}E_{DC}$, one then obtains a maximum possible value for r of about pm/V. The first conclusion is that the rectification mechanism could explain the magnitude of r measured in bulk samples (~0.4 pm/V). The second conclusion is that this same mechanism may or may not explain the higher values of r (1.3 to 5.8 pm/V) reported more recently.

A second mechanism, which we now feel is key to the poling process, is dipole orientation. During poling, the high electric field applied to the sample spatially orients molecular bonds, in particular Si—O bonds in the case of silica, towards a direction parallel to the applied field. Each Si—O bond is a dipole that is asymmetric and thus exhibits a small second-order nonlinearity. In crystalline quartz, which has Si—O bonds regularly oriented in space, the contribution of all molecules add up constructively to produce a sizeable macroscopic nonlinearity (r~0.5 pm/V). In unpoled amorphous silica, the Si—O bonds are randomly oriented in space, and their contributions cancel out, i.e., there is no net macroscopic nonlinearity. Poling amorphous silica orients some of the bonds in a preferential direction (the direction of the applied field), which induces a finite macroscopic nonlinearity. This dipole orientation mechanism is well known in the poling of other materials, such as polymers. Estimates based on the nonlinearity of fused quartz suggest that this mechanism could lead to large values of r, of the order and even larger than the 1.3–5.8 pm/V reported so far.

We have recently further elucidated this issue by studying theoretically the dependence of the induced r on the polarization of the optical signal. Our finding is that if the nonlinearity is due to rectification of $\chi^{(3)}$, an optical signal with a polarization parallel to the poling field and an optical signal with a polarization perpendicular to the poling field should experience the same modulation. If it is due to dipole orientation, one polarization should experience a modulation 3 times stronger than the other. Measurements reported in the literature, as well as recent unpublished measurements we have carried out, clearly show a 3-to-1 ratio in the modulation of the two polarizations. This result is another evidence that dipole orientation is the likely mechanism.

Based on these two findings, we can formulate an improved poling technique which is projected to yield very strong nonlinearities. Since it is desirable to orient a large density of bonds, the key requirements are (1) to heat the sample to temperatures as large as possible to increase molecular agitation, and (2) to apply a very large field, as high as dielectric breakdown permits, in order to align a large fraction of the molecules in the direction of the field. This is consistent with what is routinely done to pole polymers. In one particular reference, a doped polymer was poled around 200° C. with fields of 100–300 V/μm. See J. F. Valley et al., "Thermoplasticity and parallel-plate poling of electro-optic polyimide host thin films", Appl. Phys. Lett. Vol. 60, No. 2, 160–162, January 1993. To date, silica has been poled under 300° C. and with fields under 80 V/μm. The highest reported r value (5.8 pm/V) was in fact obtained with the highest poling field of 80 V/μm, but it was carried out at room temperature. We believe that by increasing both the poling temperature (to 450° C. or higher) and the field (to close to the breakdown of silica, i.e., 800 V/μm or higher) or voltage (greater than 20 kV), we can increase the fraction of oriented molecules over what has been done so far, and thus induce an even larger nonlinearity.

At room temperature, the breakdown field of dry air occurs around 3 V/μm. At higher temperature this value decreases. Since the breakdown field of air is so low, especially at elevated temperature, special techniques must be used in practice to pole at high temperature and high field. One solution is to operate in a vacuum. At a given temperature, as the air pressure is decreased the breakdown voltage first decreases, then increases. To be able to pole at temperatures of 450° C. or greater, the poling apparatus (oven and wires and electrodes supplying the voltage) must thus be placed in a vacuum of $10^{-7}$ torr or better. This can be carried out with bulk samples, waveguide chips or fibers.

As an alternative, a second embodiment of this invention is to use a sample with a larger lateral dimension. Lateral dimension means the dimension of the sample in the directions perpendicular to its thickness. In this manner, the air path between the two electrodes is increased. When this path is long enough, the electric field along said path is reduced below the dielectric breakdown of air at the poling temperature, and air breakdown does not occur. As a specific example, if the sample is poled at 40 kV at some elevated temperature where the dielectric breakdown of air is 0.4 V/μm, the air path length between the electrodes around the sample must be greater than 40 kV/0.4 V/μm, or greater than 10 cm. Thus in this particular example the sample lateral dimension must be at least 10 cm to avoid air breakdown. Consequently, in this embodiment poling can take place in air and the need for a vacuum is eliminated.

Another technique demonstrated elsewhere, which involves twin-electrode fibers (see Fujiwara et al. and Kazansky et al.) can also be applied, in air or in a vacuum. These fibers have identical guiding properties as standard single-mode fibers, except that they have two small holes running parallel to the core, symmetrically located a few microns on either side of the core. Thin metal electrodes are inserted in each hole from opposite directions so that they spatially overlap along some length of fiber. Feeding the electrodes from opposite directions avoids breakdown in air.

A fourth possible embodiment involves a so-called D-shaped fiber, i.e., a fiber with a core a short distance (typically a few microns) below the surface of the cladding. This fiber is poled by placing it between two electrodes and heating it up in a high vacuum. Since the nonlinear region is created just below the anode, the fiber must be oriented so that its core region is just below the anode, so that the nonlinear region is induced in the core region of the fiber. In this manner the optical signal traveling in the core will overlap more strongly with the nonlinearity, producing a maximum phase shift.

Readers familiar with the art will find it obvious that various standard field suppression techniques, i.e. techniques aimed at increasing the air breakdown voltage or field threshold, can also be implemented in the context of this invention in a straightforward manner (see for example L. E. Myers, R. C. Eckardt, M. M. Fejer, W. R. Bosenbert, and J. W. Pierce, "Quasi-phase matched optical parametric oscillators in bulk periodically poled LiNbO$_3$," Journal of Optical Society of America B. (Optical Physics), vol. 12, no. 11, pp. 2102–2116, November 1995).

FIG. 1 shows a schematic of the poling apparatus. The oven is placed inside an enclosure, which can be, as described above, a vacuum chamber. The thermal cycle of the sample during poling, illustrated in FIG. 2, is important. At time $t=t_0=0$, the sample is at room temperature and the oven is turned on so that the temperature starts to increase. The poling voltage can be applied at this time, or at $t=t_1$, the time at which the temperature reaches its maximum value $T_0$. The rate of temperature increase during heating, labelled $\alpha$ in FIG. 2, needs to be slow enough to avoid thermal damage of the glass. A rate of a few ° C. per minute is usually adequate for silica-based glasses, though other rates, slower or faster, will give similar results. After time $t=t_1$, the temperature is forced to remain at the level $T_0$ until time $t=t_2$. The optimum poling time $t_2-t_1$ is likely to be of the same order as the poling time used for the current poling process, which is in the range of one to several tens of minutes. For a given poling field or voltage, we expect that there is an optimum poling temperature $T_{opt}$ which will yield the best results, in terms of nonlinearity strength, depth of the nonlinear region, or both. This optimum temperature can be measured experimentally. Alternatively, one can choose a temperature $T_0$ which is higher than $T_{opt}$, and cool the sample, starting at $t=t_2$, at a slow enough rate, while the poling field is still applied. In this manner, the sample remains in the vicinity of a given temperature for a long enough time (say several minutes). As the temperature drops from $T_0$ to $T_{opt}$, the sample is thus repoled at a decreasing temperature, reaching optimum poling conditions when the temperature reaches $T_{opt}$. When the sample cools further ($T \ll T_{opt}$), its poling status does not evolve anymore because the temperature is too low to allow, in the presence of the high voltage, significant motion of the dipoles that have been aligned earlier on. The poling characteristics thus remain unchanged and optimum. This method of slow ramping therefore allows optimum poling without an exact knowledge of the exact optimum poling temperature. To make this possible, the cooling rate ($\alpha_2$ in FIG. 2) should be low enough to allow the sample to be in constant poling equilibrium. A cooling rate of 1° C. every few minutes (i.e., 0.5–0.1° C./minute) is likely to be adequate. After the sample has cooled to a sufficiently low temperature, the temperature can be ramped down at a higher rate, perhaps a few degrees C. per minute, and this rate can be increased as the temperature decreases, the object being to reduce the total cooling time. The temperature at which the cooling rate can begin to be safely increased will depend on the composition of the glass and its thermal history, and must be determined experimentally with short experiments. The corresponding total cooling time $t_3-t_2$ is therefore in the general range of 10–20 hours or shorter. When the sample temperature is close to room temperature, the field is turned off, which completes the poling process.

Alternatively, as mentioned above, one can determine $T_{opt}$ experimentally and pole at temperature $T_{opt}$, then using faster cooling (at a rate $\alpha_1$). The optimum temperature $T_{opt}$ can be measured experimentally by carrying out repeated poling at various temperatures $T_0$, with moderately fast cooling (again at a rate $\alpha_2$ comparable to $\alpha_1$), and measuring for each poling temperature the nonlinearity of the sample. The optimum temperature is the temperature that yields the maximum nonlinearity, either in terms of nonlinearity strength, nonlinear region depths, or both. After $T_{opt}$ has been determined, poling is carried out in the same manner as described in the previous paragraph except that cooling can be done at a higher rate, say a few ° C. per minute.

This improved poling technique is expected to produce nonlinearities equal to a sizeable fraction of that of $LiNbO_3$. We are thus expecting a $\pi$ phase modulation of a 1.55 $\mu$m signal with only 20–30 V in a 10-cm fiber. The internal loss of the device will be extremely small. A given device will have a bandwidth equal to the guiding bandwidth of the fiber, i.e., hundreds of nanometers, provided the voltage is adjusted for each signal wavelength (since the phase modulation varies as the reciprocal of the signal wavelength, i.e., shorter wavelengths require a lower voltage). Similarly, this type of fiber modulator can be made to operate anywhere in the UV to IR range by fabricating it with a fiber that carries a single mode in the desired spectral range.

The process disclosed herein differs from existing processes known as thermal poling. The main differences are that the process uses (1) a much high temperature (greater than 450° C.), and (2) a high field (hundreds of volts per micron). This should be compared to the typical conditions under which thermal poling is always done, namely a temperature of around 280° C. and a high applied voltage but a small field and voltage (typically several thousand volts across a sample with a thickness of one to a few millimeters).

The mechanism we have detailed above to explain the importance of poling at high field and high temperature differs from the mechanisms published in the literature. As mentioned above, one group has claimed that the nonlinearity of the poled sample depends on the applied poling voltage but not the applied field, meaning that two samples of different thicknesses poled at the same voltage will yield the same nonlinearity. See Myers et al. Another group has published a study from which they draw the exact opposite of the conclusion we put forth here, that is, that the main mechanism behind the nonlinearity of poled silica is rectification of $\chi^{(3)}$ due to the space charges. See P. G. Kazansky, and P. St. J. Russell, "Thermally poled glass: frozen-in electric field or oriented dipoles?", Opt. Comm. Vol. 110, 611–614, 1994.

This discrepancy does not affect the content of this invention. Unpublished experiments conducted by the inventors show that the application of the poling technique described herein, namely poling at a high temperature (>400° C.) and a high voltage (>30 kV) or high field (>10 V/$\mu$m), produces nonlinear regions with a stronger and/or deeper second-order nonlinearity than obtained by poling the same glass at the lower temperature, lower field and/or lower voltage thermal poling technique described in the literature. For example, with several commercial bulk glasses, increasing either the poling voltage or the poling field (for a poling temperature around 400° C. and poling time of about 30 minutes) increases the strength and/or depth of the nonlinear region. This conclusion applies to Infrasil 302, Herasil 1 and T08 (commercial-grade silica) manufactured by Heraeus Amersil, Inc., Duluth, Ga. Other glass compositions may respond the same way to an increase in these three poling parameters, although determination of the maximum (imposed by breakdown) and/or optimum values for these parameters will depend on the glass composition and will need to be determined experimentally with minimal and straightforward experimentation.

While the invention has been described with reference to specific embodiments, the description is illustrative of the invention and not limiting the invention. Various modifications and applications may occur to those skilled in the art without departing from the true spirit and scope of the invention as defined by the appended claims.

What is claimed is:

1. A method of inducing an electro-optic nonlinearity in a silica-based glass material having a dielectric breakdown field, the method comprising:

heating the silica-based glass material;

ramping up the temperature to an elevated temperature at a rate which does not physically damage the silica-based glass material, said elevated temperature selected to be at least as high as an optimum poling temperature for inducing the electro-optic nonlinearity in the silica-based glass material;

applying an electric field through the silica-based glass material, said electric field having a magnitude close to and less than the dielectric breakdown field of the silica-based glass material;

while applying said electric field, ramping down the temperature from said elevated temperature to a temperature lower than said optimum poling temperature at a rate slow enough to allow the silica-based glass material to be at a temperature close to said optimum poling temperature for a sufficient time to yield a maximum non-zero electro-optic nonlinearity of the silica-based glass material for the applied electric field and the optimum poling temperature; and turning off the electric field and allowing the silica-based glass material to return to an ambient temperature.

2. The method as defined by claim 1, wherein ramping up the temperature comprises raising the temperature of the silica-based glass material to at least 400° C.

3. The method as defined by claim 1, wherein the electric field is applied for a period of time of at least one minute.

4. A method of inducing an electro-optic nonlinearity in a silica-based glass material having a dielectric breakdown field, the method comprising:

heating the silica-based glass material;

ramping up the temperature to an elevated temperature at a rate which does not physically damage the silica-based glass material, said elevated temperature selected to be at least as high as an optimum poling temperature for inducing the electro-optic nonlinearity in the silica-based glass material;

applying an electric field through the silica-based glass material, said electric field having a magnitude close to and less than the dielectric breakdown field of the silica-based glass material, wherein said dielectric breakdown field of the silica-based glass material is approximately 800 V/$\mu$m;

while applying said electric field, ramping down the temperature from said elevated temperature to a temperature lower than said optimum poling temperature at a rate slow enough to allow the silica-based glass material to be at a temperature close to said optimum poling temperature for a sufficient time to yield a maximum non-zero electro-optic nonlinearity of the silica-based glass material for the applied electric field and the optimum poling temperature; and turning off the electric field and allowing the silica-based glass material to return to an ambient temperature.

5. A method of inducing an electro-optic nonlinearity in a silica-based glass material having a dielectric breakdown field, the method comprising:
   heating the silica-based glass material, wherein said silica-based glass material is an optical fiber;
   ramping up the temperature to an elevated temperature at a rate which does not physically damage the silica-based glass material, said elevated temperature selected to be at least as high as an optimum poling temperature for inducing the electro-optic nonlinearity in the silica-based glass material;
   applying an electric field through the silica-based glass material, said electric field having a magnitude close to and less than the dielectric breakdown field of the silica-based glass material;
   while applying said electric field, ramping down the temperature from said elevated temperature to a temperature lower than said optimum poling temperature at a rate slow enough to allow the silica-based glass material to be at a temperature close to said optimum poling temperature for a sufficient time to yield a maximum non-zero electro-optic nonlinearity of the silica-based glass material for the applied electric field and the optimum poling temperature; and
   turning off the electric field and allowing the silica-based glass material to return to an ambient temperature.

6. A method of inducing a second-order nonlinearity in a silica-based glass material, the method comprising:
   heating the silica-based glass material from an ambient temperature to an elevated temperature at a rate which does not physically damage the silica-based glass material, said elevated temperature selected to be at least 400° C.;
   applying an electric field through the silica-based glass material, said electric field having a magnitude greater than a dielectric breakdown field of air at the elevated temperature; and
   while applying said electric field, ramping down the temperature of the silica-based glass material from said elevated temperature until the temperature of the silica-based glass material is lower than an optimum poling temperature for the silica-based glass material for inducing the second-order nonlinearity in said silica-based glass material.

7. A method of inducing a second-order nonlinearity in a silica-based glass material, the method comprising:
   determining an optimum poling temperature for a silica-based glass material for inducing the second-order nonlinearity in said silica-based glass material;
   heating the silica-based glass material from an ambient temperature to an elevated temperature at a rate which does not physically damage the silica-based glass material, said elevated temperature selected to be at least as high as said optimum poling temperature;
   applying an electric field through the silica-based glass material, said electric field having a magnitude selected to be close to and less than a dielectric breakdown field of the silica-based glass material; and
   while applying said electric field, ramping down the temperature of the silica-based glass material from said elevated temperature to a temperature below said optimum poling temperature.

8. The method as defined by claim 7, wherein heating the silica-based glass material comprises raising the temperature of the silica-based glass material to a temperature of at least 450° C.

9. The method as defined by claim 7, wherein the silica-based glass material is heated and the electric field is applied while maintaining the silica-based glass material in a vacuum.

10. The method as defined by claim 9, wherein the pressure in the vacuum is no more than approximately $10^{-7}$ torr.

11. The method as defined by claim 9, wherein the silica-based glass material is positioned in proximity to a heat source and the heat source is positioned in a vacuum chamber.

12. The method as defined in claim 7, wherein a voltage of at least 20,000 volts is applied to said silica-based glass material.

13. The method as defined in claim 7, wherein the temperature of the silica-based glass material is ramped down at a rate of a degree Celsius every few minutes.

14. A method of inducing a second-order nonlinearity in a silica-based glass material, the method comprising:
   determining an optimum poling temperature for a silica-based glass material for inducing the second-order nonlinearity in said silica-based glass material;
   heating the silica-based glass material from an ambient temperature to an elevated temperature at a rate which does not physically damage the silica-based glass material, said elevated temperature selected to be at least as high as said optimum poling temperature;
   applying an electric field through the silica-based glass material, said electric field having a magnitude selected to be close to and less than a dielectric breakdown field of the silica-based glass material, wherein said dielectric breakdown field of the silica-based glass material is approximately $800V/\mu m$; and
   while applying said electric field, ramping down the temperature of the silica-based glass material from said elevated temperature to a temperature below said optimum poling temperature.

15. A method of inducing a second-order nonlinearity in a silica-based glass material, the method comprising:
   determining an optimum poling temperature for a silica-based glass material for inducing the second-order nonlinearity in said silica-based glass material, wherein the silica-based glass material is an optical fiber having a core and a cladding, wherein the core is positioned a few microns below a surface of the cladding, and wherein the second-order nonlinearity is induced in the core of the optical fiber;
   heating the silica-based glass material from an ambient temperature to an elevated temperature at a rate which does not physically damage the silica-based glass material, said elevated temperature selected to be at least as high as said optimum poling temperature;
   applying an electric field through the silica-based glass material, said electric field having a magnitude selected to be close to and less than a dielectric breakdown field of the silica-based glass material; and
   while applying said electric field, ramping down the temperature of the silica-based glass material from said elevated temperature to a temperature below said optimum poling temperature.

* * * * *